J. W. SWETNAM & C. O. ELAM.
CLEVIS.
APPLICATION FILED MAR. 20, 1909.
933,138.
Patented Sept. 7, 1909.
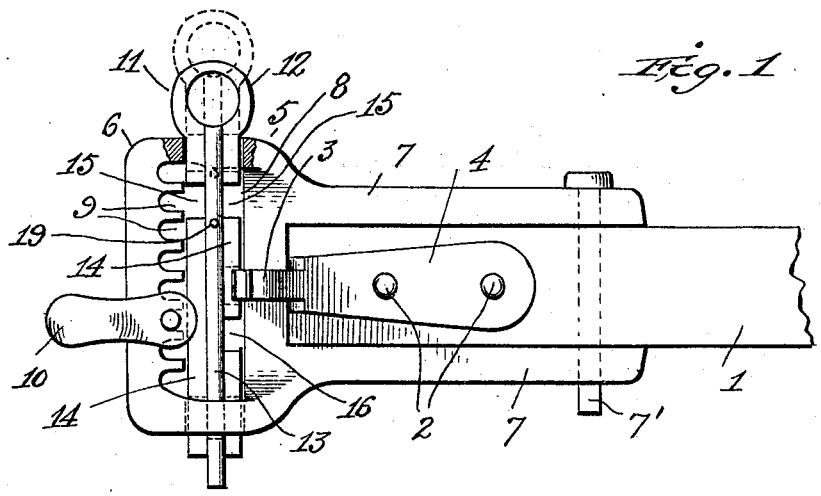
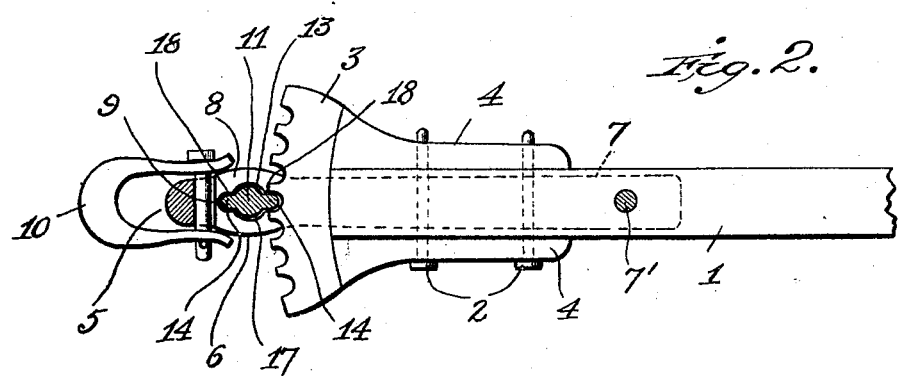
Witnesses
Percy B Hills
Edwin F Fry
Inventors
John W. Swetnam
Chester O. Elam
By
Edwin L. Yewell
Attorney

UNITED STATES PATENT OFFICE.

JOHN W. SWETNAM AND CHESTER O. ELAM, OF MOUNT STERLING, KENTUCKY.

CLEVIS.

933,138.  Specification of Letters Patent.  Patented Sept. 7, 1909.

Application filed March 20, 1909. Serial No. 484,791.

*To all whom it may concern:*

Be it known that we, JOHN W. SWETNAM and CHESTER O. ELAM, citizens of the United States, residing at Mount Sterling, in the county of Montgomery and State of Kentucky, have invented certain new and useful Improvements in Clevises, of which the following is a specification.

This invention relates to improvements in clevises for plows and other implements and has for its object to provide means whereby the adjustment of the draft can be made without removing the locking pin from the clevis. This object is attained by the means illustrated in the accompanying drawing in which, Figure 1 represents a side elevation of our invention, and Fig. 2 a central horizontal section, showing the plow beam in plan.

Similar numerals of reference denote corresponding parts in the several views.

In the drawing the reference numeral 1 denotes the end of a plow beam having secured thereto by tie bolts 2, the horizontal toothed segment 3, said segment being provided with the rearwardly extending side pieces 4 which engage the sides of the plow beam.

Pivotally mounted upon and straddling the end of the beam 1 is the clevis 5, formed of a head 6 and the legs 7, through which and the beam 1 is passed the vertical pivot bolt 7', said head 6 being provided with an aperture 8 on the forward side of which is formed recesses or notches 9, for adjustably supporting therein the clevis ring 10.

To secure the clevis in position in its lateral adjustment, and the clevis ring in its vertically adjusted position, a pin 11 is provided, which has bearings in the top and bottom walls of the aperture and is supported by its head 12. This pin 11 is formed of a circular central portion 13 having wings 14 of less diameter extending from its sides, both of said wings being slotted at 15 near their top ends, and one of said wings having an additional slot 16 just below its center, the said wings terminating short of the end of the circular portion 13. The slots in the top and bottom walls of the clevis are formed correspondingly to the shape of the pin 11 in cross section, viz., a circular opening 17 having side slots 18 for the purpose hereinafter specified. A pin 19 in the locking pin 11 limits the upward movement of said pin and prevents its withdrawal from the clevis head.

In operation when it is desired to change the adjustment of the clevis 5 or the clevis ring 10, or both, the locking pin 11 is lifted vertically until the pin 19 strikes the upper wall of the aperture 8. When it reaches this position the slots 15 are central of said upper wall, the slot 16 is central of the toothed segment 3, and the ends of the wings 14 are above the lower wall of the aperture 8; the locking pin 11 can now be turned in its circular bearings and is supported in its unlocked position, and the said clevis and clevis ring can be adjusted.

It will be observed that the lock pin 11 cannot move laterally in its bearing in any of its positions, its central circular portion 13 being guided and supported at all times in the circular openings 17, but can be rotated therein. It will be further observed that when the locking pin 11 is in its locking position, that the wing 14 on one side engages the toothed segment 3 to hold it in its adjusted position and the wing 14 on the opposite side covers the mouths of the recesses or notches 9, and secures the clevis ring 10 in its position.

Having thus described our invention, what we claim is:

1. A clevis embodying an apertured head, a clevis ring engaging therewith, a locking pin for the clevis ring, said locking pin having a vertical and rotating movement to the unlocking position and means for preventing the rotating movement until the vertical movement is completed.

2. In combination with a draft bar, an adjustable clevis embodying an apertured head, an adjustable clevis ring, and a single lock for securing the clevis and ring in their adjusted positions, said lock having means for supporting it in its unlocked position.

3. A clevis, an adjustable clevis ring, and a lock for securing the clevis ring in its adjusted positions, said lock having means for supporting it and preventing its withdrawal in its unlocked position.

4. In combination with a draft bar, an adjustable clevis, and a lock to secure it in its adjusted positions, said lock having means for supporting it in its unlocked position, said means preventing its rotation in its locked position.

5. In combination with a draft bar, an adjustable clevis, and a lock to retain it in its adjusted positions, said lock being non-detachable without rotating when in its unlocked position.

6. In combination with a draft beam, a clevis horizontally adjustable with respect thereto, and a lock for the same permanently located therein and adapted to lock or unlock said parts and to be supported in either position, said lock having a longitudinal and rotating movement.

7. In a clevis, an apertured head, a clevis ring engaging therewith, a locking pin adapted to be shifted longitudinally and to be then rotated to the unlocking position with respect to said clevis ring, and means for preventing its rotation until after its longitudinal shift is completed.

8. In a clevis, an apertured head, a clevis ring engaging therewith, a locking pin adapted to be shifted to the unlocking position with respect to said clevis ring, and means on said pin for supporting it in said unlocked position said means preventing its rotation when in a locked position.

9. In a clevis, an apertured head, a clevis ring engaging therewith, a locking pin adapted to be rotated to the unlocking position, means on said pin for supporting it in said unlocked position with respect to said clevis ring, and means for preventing lateral movement of said pin in its bearings while being rotated.

10. In a clevis, an apertured head, a clevis ring engaging therewith, a locking pin adapted to be shifted longitudinally and to be rotated to the unlocking position with respect to said clevis ring, means for preventing its withdrawal from the head while in its unlocked position, and means for limiting its longitudinal movement.

11. In a clevis, an apertured head, a clevis ring engaging therewith, and a locking pin embodying a circular central portion and side wings and adapted to be rotated to an unlocking position with respect to said clevis ring, said side wings being slotted to allow the pin to rotate and to prevent its withdrawal from the head while in said position.

12. A clevis embodying an apertured head, a locking pin journaled in said head, said pin comprising a central circular portion and side wings and adapted to be shifted vertically to the unlocking position and to be rotated to an unlocked position, said central circular portion adapted to remain in contact with its bearings and said side wings being slotted to allow the pin to rotate.

In testimony whereof we affix our signatures, in presence of two witnesses.

JNO. W. SWETNAM.
CHESTER O. ELAM.

Witnesses:
Joel Oldham,
J. A. Holton.